United States Patent [19]
Walker et al.

[11] Patent Number: 5,102,020
[45] Date of Patent: Apr. 7, 1992

[54] MANIFEST CONTAINER FOR CARRYING DOCUMENTS WITH A RAILROAD CAR

[76] Inventors: Brian F. Walker, 17805 Wallingford Ave. North, Seattle, Wash. 98133; Marvin H. Weiner, 1900 Geist Rd., Glyndon, Md. 21071-5001

[21] Appl. No.: 460,468

[22] Filed: Jan. 3, 1990

[51] Int. Cl.⁵ ............................................. B60R 11/00
[52] U.S. Cl. ................................ 224/29.5; 224/42.42; 224/42.45 R; 224/277; 248/231; 40/660; 220/476; 220/480; 220/331; 220/336
[58] Field of Search ............ 224/29.5, 42.42, 42.45 R, 224/277, 273, 42.38, 42.39; 105/355, 404, 463.1, 325; 220/331, 336, 214, 476, 480, 481; 248/219.4, 231, 74.3; 215/236; 40/660, 655

[56] References Cited

U.S. PATENT DOCUMENTS

| | | |
|---|---|---|
| 978,432 | 12/1910 | Chellis . |
| 1,511,539 | 10/1924 | Suarez ..................................... 40/660 |
| 1,670,962 | 10/1927 | Hall . |
| 1,697,763 | 1/1929 | Hall . |
| 2,135,567 | 11/1938 | Doherty .............................. 220/476 |
| 2,180,294 | 11/1939 | Hankins ................................. 40/660 |
| 2,210,063 | 8/1940 | Campbell et al. ...................... 40/660 |
| 2,235,870 | 3/1941 | Dedmon . |
| 2,936,992 | 5/1960 | Browning ............................. 248/313 |
| 3,156,055 | 11/1964 | Hennessy, Jr. ........................ 40/660 |
| 3,227,410 | 1/1966 | McCuen ........................ 224/42.45 R |
| 3,323,755 | 6/1967 | Voitas et al. . |
| 3,506,216 | 3/1970 | Delamater . |
| 4,180,228 | 12/1979 | Snyder et al. . |
| 4,254,888 | 3/1981 | Chandler ............................. 220/336 |
| 4,377,245 | 3/1983 | Patty . |
| 4,434,906 | 3/1984 | Florczyk et al. . |
| 4,562,047 | 12/1985 | Sestak et al. ......................... 220/214 |
| 4,674,933 | 6/1987 | Brown . |

FOREIGN PATENT DOCUMENTS

| | | | |
|---|---|---|---|
| 576137 | 8/1924 | France ................................ 248/231 |
| 29317 | of 1913 | United Kingdom ................. 220/336 |

*Primary Examiner*—Linda J. Sholl
*Attorney, Agent, or Firm*—Seed and Berry

[57] ABSTRACT

A document shipping container assembly adapted to be coupled to a railroad car is disclosed. The document shipping container assembly includes a support member, a container, and a lid. The support member is attached to the railroad car and the document shipping container is attached to the support member. The bottom of the support member is shaped to mate with a curved Murphy End of a railroad car to position the container in a recessed location. The lid includes a circumferentially extending flange overlapping the container and the mating surface between the lid and the container. The seal between the container and the lid is watertight when the lid is closed. A latch permits the lid to be locked shut onto the container to prevent unauthorized persons from removing the documents therein. A non-repairable sealing member, such as a plastic strap, extends through the latch to provide an indication whether the documents have been tampered with. The lid is coupled with a spring-loaded hinge to the container to ensure that the lid automatically closes when released by a user. The entire shipping container assembly is constructed to be weather-resistant, and to ensure delivery of dry and intact documents.

7 Claims, 3 Drawing Sheets ial Field

This invention is related to a container for carrying documents and, more particularly, to a manifest container coupled to the end of a railroad car for holding and protecting documents carried with the car.

MANIFEST CONTAINER FOR CARRYING DOCUMENTS WITH A RAILROAD CAR

TECHNICAL FIELD

This invention is related to a container for carrying documents and, more particularly, to a manifest container coupled to the end of a railroad car for holding and protecting documents carried with the car.

BACKGROUND OF THE INVENTION

Documents, such as manifests, invoices, bills of lading, or the like are frequently required to accompany products shipped by railroad car. The products may be of the type that documents are not attachable to them, such as corn, oil, frozen foods, or the like. Having the engineer or other person on the train be responsible for the proper transfer of the documents is not practical because the car may be transferred many times to different trains. In the prior art, the documents are attached to the car holding such a product and are taken from the car by the party receiving the product from the car.

Documents are attached to the railroad cars using many different techniques. To minimize the risk of loss, the documents are sometimes attached inside of the cars. The documents cannot be attached inside some types of railroad cars, such as cars that carry liquid oil products, refrigerated cars, or the like. For such cars, the documents are placed in a holder or plastic bag and attached to the outside of the cars.

Properly attaching the documents to the outside of a railroad car frequently requires human judgment and skill. An employee may not follow the proper procedures in placement and attachment of the critical documents. The likelihood of documents being destroyed, lost, or not being found increases if the railroad employee does not follow the proper procedures in attaching documents. Even if properly attached, documents coupled to the outside of the railroad car may be destroyed by weather, vandals, or hazards encountered during travel.

SUMMARY OF THE INVENTION

It is therefore an object of this invention to provide a shipping container adapted to be attached to the outside of a railroad car.

It is a further object of this invention to provide a method of storing and shipping documents with a railroad car that protects the documents and is convenient for both the shipper and the receiver.

These and other objects of the invention, as will be apparent herein, are accomplished by providing a document shipping container assembly attachable to an end of a railroad car. The shipping container assembly includes a support member, a container, and a lid. The support member is attached to the railroad car. The bottom of the support member is shaped to mate with a curved "Murphy End." The container is coupled to the support member. The container holds the documents. The seal between the container and the lid is watertight when the lid is closed. The lid includes a circumferentially extending flange overlapping the container and a mating surface between the lid and the container. A latch extends through the flange to permit the lid to be locked shut onto the container for preventing unauthorized persons from removing the documents.

DETAILED DESCRIPTION OF THE INVENTION

Figure 1:
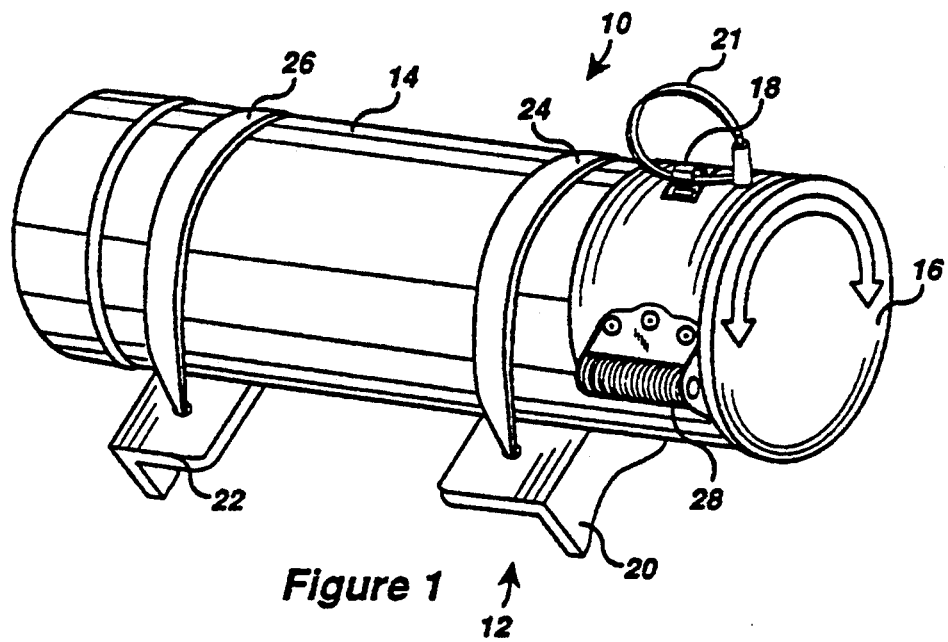
FIG. 1 is an isometric view of a shipping container assembly.
Figure 2:
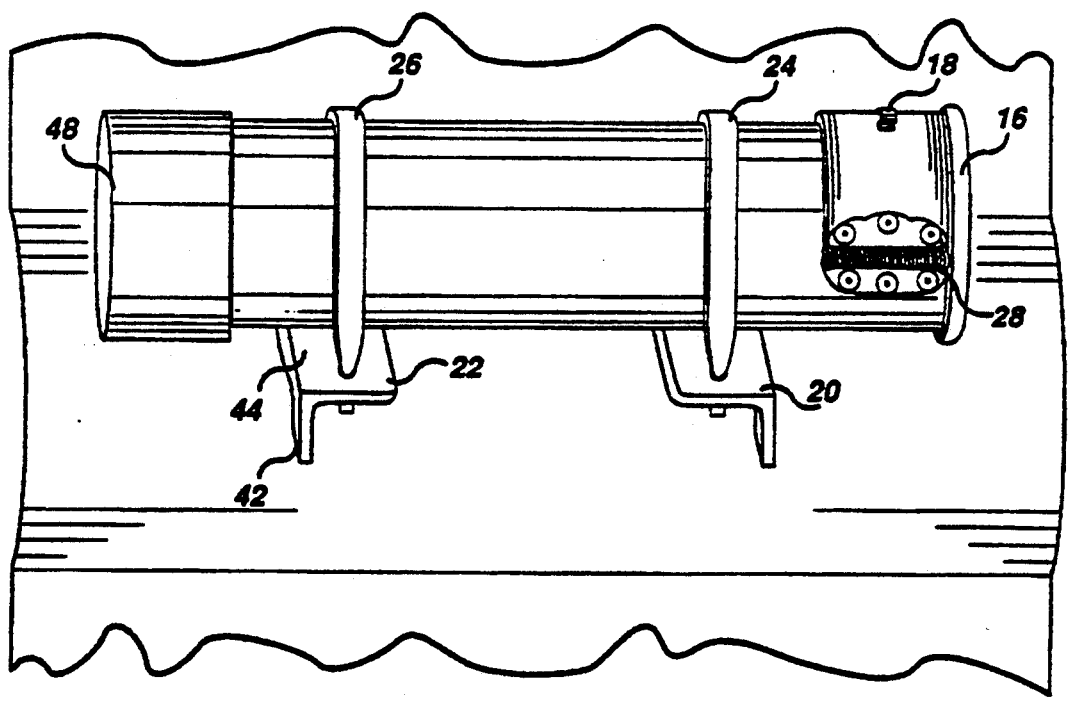
FIG. 2 is a side elevational view of the shipping container assembly coupled to the Murphy End of a railroad car.

FIGS. 1 and 2 show a shipping container assembly 10. The shipping container assembly 10 includes a support member 12, a container 14, a lid 16, and a latch 18. Straps 24 and 26 securely attach the container 14 to the support member 12. A hinge assembly 28 couples the lid 16 to the container 12.

Figure 3:
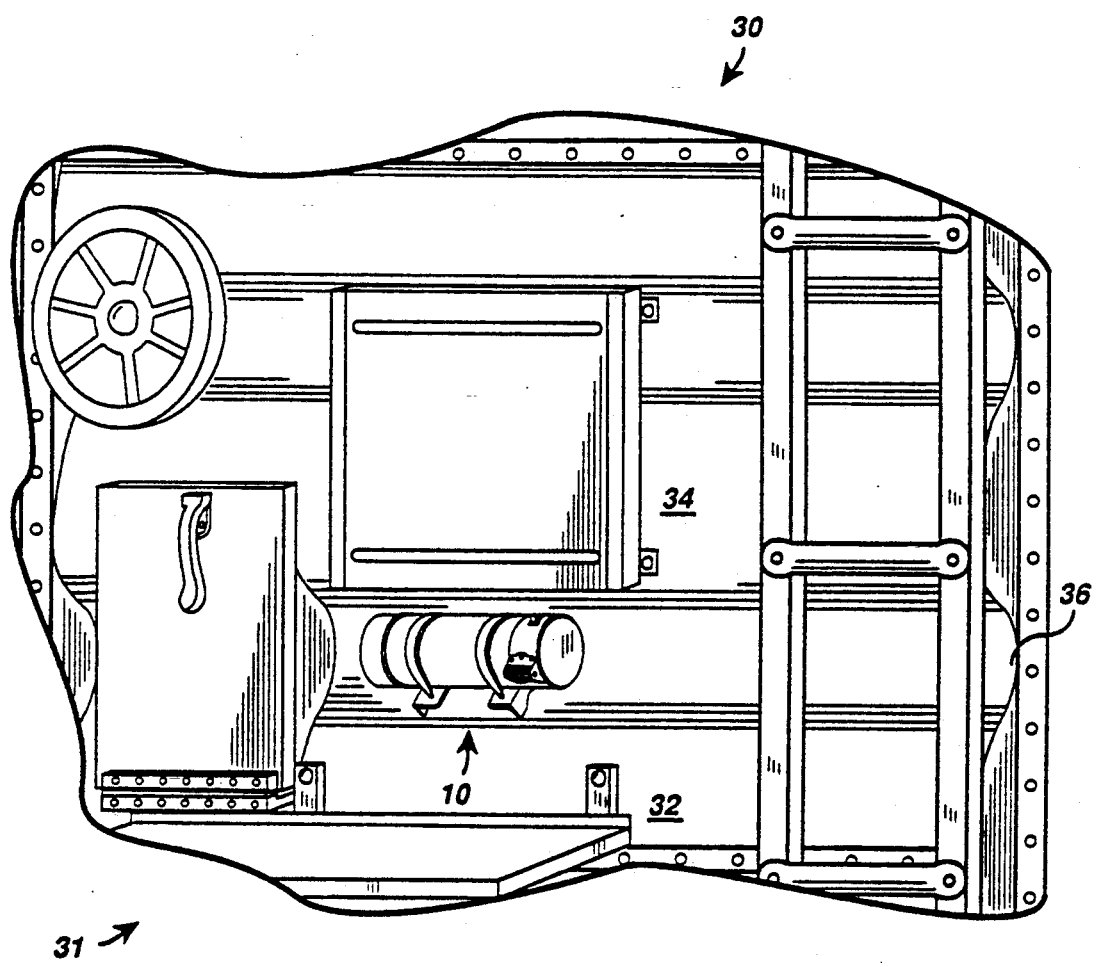
FIG. 3 is an isometric view of the Murphy End of a railroad car attached to a shipping container assembly.
Figure 4:
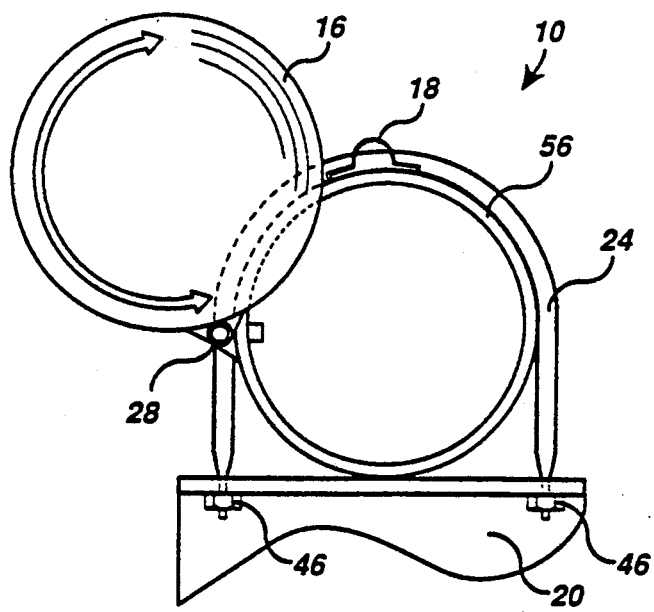
FIG. 4 is an end view of the shipping container assembly with the lid in the open position.

In the embodiment of FIGS. 1-4, the support member 12 includes two individual support members 20 and 22. The straps 24 and 26 extend around the container 14 and are coupled into the support members 20 and 22 at each end, respectively. The straps are metal strips that are flat where they contact the container 14 and are round at each end. As shown in FIG. 4, a nut 46 is threaded onto each end. Tightening the respective nuts 46 pulls the straps 24 and 26 tightly around the container 14. Any suitable securing member, including fabric straps, bolts, or the like, could be used to rigidly fix the container 14 to the support member 12. A suitable securing method must ensure that the container does not separate from the support member. A releasable securing member, such as the threaded straps 24 and 26, advantageously permits removal and replacement of the container 14 (if it becomes damaged, or for other reasons).

The container 14 is cylindrical. The container 14 is weatherproof to withstand the sun, snow, rain, wide temperature fluctuations, wind, and other weather conditions which a railroad car may encounter. The container 14 should have sufficient strength that it is not broken by hazards encountered while the railroad car travels. In one embodiment, the container 14 is cut from a 3-inch diameter, schedule 40 PVC pipe of the type readily available on the open market and used as a pressurized water pipe. The pipe is painted for increased weatherproofing and longevity. A sun-resistant PVC pipe may be used if desired. Another material that meets the waterproof and strength requirements, such as a metal pipe or the like, may be used for container 14. An end cap 48 is fixed to one end with a watertight seal by any suitable method, such as by plastic cement or other permanent adhesive. The end cap and sealing cement are of the type sold for permanently sealing the end of the pipe when used as a water pipe. A strong, permanent seal is formed between end cap 48 and container 14. Alternatively, the end cap 48 may be threaded onto the container 14, if desired.

Figure 5:
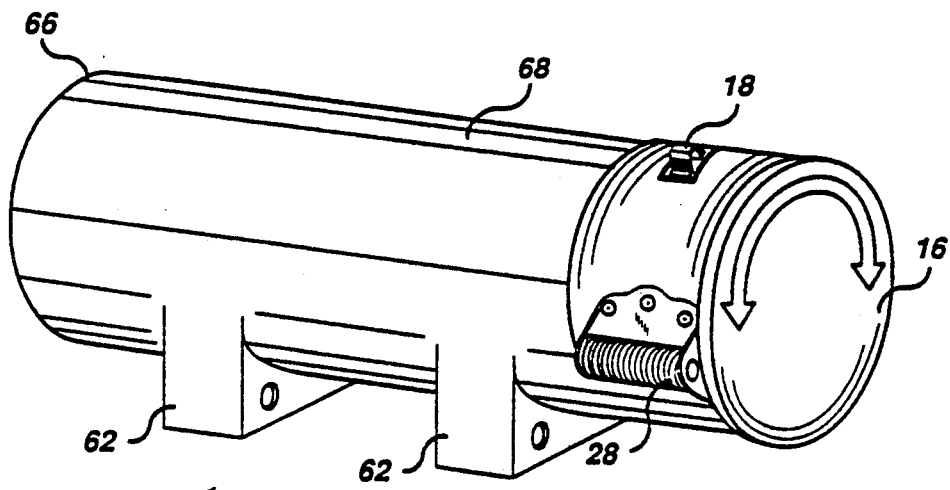
FIG. 5 is an isometric view of an alternative embodiment of the shipping container assembly.
Figure 6:
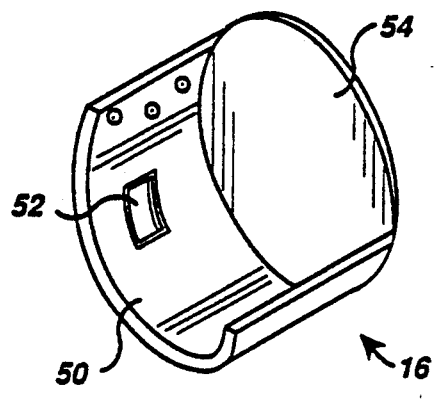
FIG. 6 is an isometric view of the lid for coupling to the shipping container.

FIGS. 1, 2, and 5 illustrate the lid 16 in the closed position on the container 14. FIG. 4 illustrates the lid 16 held in the open position to permit documents or other material to be placed into or removed from the container 14. The lid 16 is formed from an end cap of the same type used for end cap 48. The lower half of the cylindrical portion of an end cap is cut off, leaving a semicylindrical flange 50. As best shown in FIG. 6 in which the lid is illustrated alone and inverted, an opening 52 is cut through the flange 50. Holes are drilled through the flange and a spring-loaded hinge 28 is coupled to the flange.

The lid 16 is designed and formed to ensure a watertight seal when closed on the container 14. The end 54 of the lid 16 is larger in diameter than the end surface 56 of the container 14. When the lid 16 is closed, the semicylindrical flange 50 is in mating contact with the upper half of the container 14 and the flange end 54 overlays the entire circumference of the end surface 56 of the container 14. The interior of the container is thus completely sealed from moisture. Forming the lid from an end cap of the type and size normally used to seal the pipe for plumbing purposes aids in forming a solid, watertight, mating surface between the flange 50 and the container 14. If desired, a sealing member such as a rubber gasket, duct tape, or the like is placed between the lid 16 and the container 14 or around the mating surface with the lid closed to further ensure a watertight seal while in transit. Alternatively, the lid 16 may be threaded onto the container 14 to form a watertight seal.

As shown in FIG. 1, the latch 18 extends through the hole 52 of the flange 50 when the lid 16 is closed. The latch 18 is a metal, half-loop member rigidly coupled to the container 14 by any suitable method, such as threaded screws or the like. A locking member 21 extends through the latch 18 to securely lock the lid in the closed position. The locking member 21 is a nonrepairable sealing member, such as a plastic strap, that is shut with a seal which cannot be opened. To open the lid 16, the plastic strap must be cut or broken. The plastic strap cannot be repaired or joined again once it has been broken and thus provides a tamper-proof method of determining if the lid has been opened. Such a locking member 21 provides an indication that the documents have not been tampered with until the container 14 is opened by the proper user. The locking member may include, in addition to, or in place of, the sealing member a steel lock, openable by key or combination. Only an authorized user has the key or the combination to unlock the lock and open the container 14 to remove or insert documents.

The hinge 28 coupling the lid 16 to the container 14 is a spring-loaded hinge. As shown in FIG. 4, placing documents into the container 14 is a two-hand operation because the hinge 28 is a spring-loaded hinge. To open the container, the user grips the lid 16 and rotates it about the hinge 28. The flange 50 rotates away from the container 14. The user holds the lid open with one hand while placing documents in or removing them from the container 14. The hinge automatically closes the lid 16 onto the container 14 when the lid is released by the user. Having the lid automatically close when released by the user and held shut provides the advantage that the interior of the container 14 is always protected from the weather. A user cannot walk away and leave the lid 16 open. The spring is sufficiently strong that the lid is held in a watertight seal against the container 14. The hinge 28 is cadmium-plated to increase its weather resistance.

As best shown in FIGS. 3 and 4, the support member 12 is shaped to position the container assembly in a specific location on an end 31 of the railroad car 30. The railroad car 30 of FIGS. 2 and 3 has a Murphy End, a shape well known in the railroad industry. A Murphy End 31 includes a pair of curved surfaces 32 and 34 having a valley 36 between them. The bottom surface 42 of the support member 12 is shaped to attach to the curved surface 32 and the valley 36, as shown in FIG. 4. The support member 12 includes a concave portion 38 for fitting over the curved surface 32 and a convex portion 40 for fitting into the valley 36.

As shown in FIG. 3, the support member 12 is shaped to position the container 14 in a protected location. Positioning the shipping container 14 at least partially within the valley 36 provides significant additional protection from environmental conditions and hazards that may be encountered while the train is traveling from one location to another. The cars 30 are coupled end-to-end when formed into a train, thus providing additional protection to the shipping container 14. The likelihood of the container 14 being knocked off as the train passes an object near the tracks is minimized by coupling the container 14, in a recessed location, as well as to an end 31 facing another car. In one embodiment, not shown, the container 14 is nestled in the valley 36, flush against the railroad car to provide even more protection.

The bottom 42 of the support member 12 is shaped to mate with the supporting surface on the railroad car 30. Some railroad cars do not have a Murphy End, but have a flat region or other surface shape in the same place as the curved surfaces of a Murphy End. The bottom support member 12 is shaped to mate with the supporting surface on the end 31 of the railroad car 30, whether it be flat, curved, or some other shape.

As shown in FIG. 3, the shipping container assembly 10 is coupled at a height on the railroad car 30 such that the container is accessible by a user standing on the ground. The user is provided easy access to the container to facilitate opening the container, inserting or removing documents, or sealing the container or the like.

The entire shipping container assembly 10 is constructed to be weather-resistant and to ensure delivery of dry and intact documents. Because the container 14, end cap 48, and lid 16 are formed from parts generally used as outdoor water pipes, the shipping container assembly 10 is resistant to moisture and other weather conditions. The sealing surface between the lid 16 and the container 14 is a watertight seal held under the spring force of spring hinge 18. All metal components, such as straps 24 and 26, and hinge 28, are treated to have a longer life in outdoor weather. The position of the shipping container assembly 10 on the railroad car 30 minimizes the impact from adverse weather and the likelihood of being damaged. Railroad identification marks, such as B.N., U.P., S.P., or the like, may be placed on the container 14, either by painting, embossing, or the like for identification and theft deterrence.

FIG. 5 is an isometric view of an alternative embodiment having the support member 12, end cap 48, and container 14 formed as a single, integral-piece container assembly 65. The integral container assembly 65 is formed by injecting molding, casting, or other technique. The container assembly 65 includes a support member portion 62 for attaching to a railroad car 30, a sealed end 66, and a cylindrical container portion 68. An end cap is not required because the end 66 is an integral, nonporous portion of the container assembly 65. The bottom 42 of support members 62 has a shape for coupling to the flat surface of a railroad car. The bottom surface 42 could be formed to couple to a Murphy End, as shown in FIG. 4, or to any other surface of a railroad car, as desired. A lid 16 is coupled to the container assembly 65 by a hinge 28 in a similar manner and having similar properties to those previously described with respect to the embodiment of FIGS. 1-4. The latch 18 is coupled to the container assembly 65 and functions as previously described. Constructing the container assembly 65 as an integral member is more cost-effective in some circumstances.

We claim:

1. A document shipping container assembly adapted to be coupled to the outside of a railroad car, comprising:

a support member adapted to be coupled to a railroad car;

a water-tight, weatherproof container coupled to said support member, said container being cylindrical in shape and having a first and a second end and having an opening at said first end;

a water-tight, circular, disk-shaped, lid coupled to said first end of said container, said lid being openable to permit material to be placed within or removed form said container, a water-tight seal being formed between said container and said lid for preventing water from entering said container when said lid is closed, said lid having a larger diameter than said container to overlap a mating surface between said lid and said container;

an arcuate flange extending circumferentially from the upper edge of said disk-shaped lid and extending towards said second end of said container to extend over the mating surfaces of said lid and said container on an outside upper surface of said assembly to shield said upper surface from hazardous conditions, said flange having a large surface area extending in abutting contact with said container and forming a watertight seal with an upper surface of said container;

an aperture extending through said flange and positioned on an upper surface of said flange, said aperture being spaced a selected distance from said mating surfaces to ensure that water cannot spread to said mating surfaces by entering through said aperture;

a spring-loaded hinge coupled to said container and to said flange, said hinge coupling said lid to said container, said spring-loaded being coupled to said container along an outside circumference of said container and coupled to said flange and positioned to provide biasing force in an angular direction around the circumference of said cylindrical container, the mating surface of said flange and said container forming a contact surface that retains said lid in position by force being applied in an angular direction around the circumference of said container to positively position said lid over said opening in the first end of said container, said spring being positioned for biasing said lid into the closed position such that said lid will automatically close upon release from the hand of a user to form a watertight seal between said lid and said container, said watertight seal being formed by a combination of said lid, said flange, and said spring member biasing said lid into the closed, watertight position; and a lockable latch member coupled to said container and positioned to extend through said aperture of said flange when said lid is closed on said container, said latch member including an aperture through which a locking member may extend to secure said material within said container.

2. The container assembly according to claim 1 wherein said support member and said container are a single, integral member made of a moldable material, and said support member and said container are constructed in the same step in an injection mold.

3. The container assembly according to claim 1 wherein said lid is injection molded in a separate step and coupled to said container.

4. The container assembly according to claim 1 wherein said support member and said container are separate members and are coupled together with a pair of straps.

5. The container assembly according to claim 1 wherein said support member is curved along the bottome surface for coupling to said railroad car in a mating relationship with a curving, semicircular surface extending from an end of said railroad car.

6. The document container assembly according to claim 1 wherein the bottom surface of said support member is curved having a concave-extending region and a convexextending region formed in a continuously smoothly sloped bottom surface of said support member to be adapted to couple in a mating relationship with an end of a railroad car having corresponding concave and convex portions for receiving said container assembly in a position at the end of said railroad car in a protected position on said end, such that said container assembly is protected from hazards along the side of said railroad car by being mountable on an end and is protected from hazards in between said railroad car and an adjacent railroad car by being mountable in a protected, recessed position on said end.

7. The document shipping container assembly according to claim 1 wherein said spring-loaded hinge is coupled to said flange portion of said lid for firmly biasing said lid into abutting contact with said container at all times unless sufficient opposing force is provided to overcome said spring member to permit inserting documents into or removing documents from said container.

* * * * *

UNITED STATES PATENT AND TRADEMARK OFFICE
CERTIFICATE OF CORRECTION

PATENT NO.  : 5,102,020
DATED       : April 7, 1992
INVENTOR(S) : Brian F. Walker; Marvin H. Weiner It is certified that error appears in the above-identified patent and that said Letters Patent is hereby corrected as shown below:

In column 5, claim 1, line 25, please delete "form" and substitute therefor -- from --.

In column 6, claim 6, line 37, please delete "convexextending" and substitute therefor -- convex-extending --.

Signed and Sealed this

Twenty-second Day of June, 1993

Attest:

MICHAEL K. KIRK

*Attesting Officer*   *Acting Commissioner of Patents and Trademarks*